(12) United States Patent
Li et al.

(10) Patent No.: US 10,982,311 B2
(45) Date of Patent: Apr. 20, 2021

(54) METHOD OF TANGENTIAL GRADIENT THERMAL SPRAYING COATING FOR COMPLEX PROFILE WORKPIECES

(71) Applicant: SHANDONG UNIVERSITY, Shandong (CN)

(72) Inventors: Fangyi Li, Jinan (CN); Haiyang Lu, Jinan (CN); Zhen Li, Jinan (CN); Jiyu Du, Jinan (CN); Jiantong Shang, Jinan (CN); Jianfeng Li, Jinan (CN); Liming Wang, Jinan (CN); Yanle Li, Jinan (CN); Ziwu Liu, Jinan (CN); Xingyi Zhang, Jinan (CN); Xueju Ran, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 16/338,689

(22) PCT Filed: Sep. 30, 2018

(86) PCT No.: PCT/CN2018/109138
§ 371 (c)(1),
(2) Date: Apr. 1, 2019

(87) PCT Pub. No.: WO2019/109720
PCT Pub. Date: Jun. 13, 2019

(65) Prior Publication Data
US 2019/0360085 A1    Nov. 28, 2019

(30) Foreign Application Priority Data
Dec. 8, 2017   (CN) .......................... 201711298231.5

(51) Int. Cl.
*C23C 4/12*     (2016.01)
*C23C 4/04*     (2006.01)
(Continued)

(52) U.S. Cl.
CPC .................. *C23C 4/12* (2013.01); *C23C 4/04* (2013.01); *C23C 4/06* (2013.01); *C23C 4/10* (2013.01);
(Continued)

(58) Field of Classification Search
CPC .... C23C 4/12; C23C 4/10; C23C 4/04; C23C 4/06; C23C 4/073; C23C 4/01;
(Continued)

(56) References Cited

U.S. PATENT DOCUMENTS

| 5,683,226 A * | 11/1997 | Clark ...................... F01D 5/288 |
| | | 415/200 |
| 2014/0287149 A1* | 9/2014 | Zimmermann ........... C23C 4/12 |
| | | 427/446 |
| 2016/0298467 A1* | 10/2016 | Ucasz ................... C23C 14/083 |

FOREIGN PATENT DOCUMENTS

| CN | 1799054 A | 7/2006 |
| CN | 101713059 A | 5/2010 |

(Continued)

OTHER PUBLICATIONS

Feng et al.; "Research Actualities of Ductile Machining for Hard and Brittle Materials;" J. CNKI.; 2007; pp. 3-8.
(Continued)

*Primary Examiner* — Katherine A Bareford
(74) *Attorney, Agent, or Firm* — Oliff PLC

(57) ABSTRACT

A design method of tangential gradient thermal spraying coating for complex profile workpieces solves the erosion-resistant problem, and obtains a corresponding relation between the ductile-brittle ratio of the thermal sprayed coating and the impact angle change. The method includes: determining the complex profile part surface impact angle change rule according to the part operation environment conditions; selecting an erosion-resistant coating material
(Continued)

according to the service condition requirement; obtaining the relation among the impact angle, ductile-brittle angle and erosion rate of the coating by an erosion test; determining the coating and the impact angle ductile-brittle corresponding relation curve; and performing spraying by using dual-channel powder feeding thermal spraying equipment the powder feeding quantity of which is adjustable in real time, based on a matching relation between the tangential gradient coating and the surface impact angle.

5 Claims, 2 Drawing Sheets

(51) Int. Cl.
  *G06F 30/20* (2020.01)
  *C23C 4/10* (2016.01)
  *C23C 4/06* (2016.01)
  *G06F 111/04* (2020.01)

(52) U.S. Cl.
  CPC .......... *G06F 30/20* (2020.01); *G06F 2111/04* (2020.01)

(58) Field of Classification Search
  CPC .. G06F 17/5009; G06F 17/5086; G06F 30/20; G06F 30/28; G06F 2111/04
  See application file for complete search history.

(56) References Cited

FOREIGN PATENT DOCUMENTS

| | | |
|---|---|---|
| CN | 102597296 A | 7/2012 |
| CN | 102909148 A | 2/2013 |
| CN | 104516998 A | 4/2015 |
| CN | 104530945 A | 4/2015 |
| CN | 104715110 A | 6/2015 |
| CN | 106001924 A | 10/2016 |
| CN | 107032831 A | 8/2017 |
| CN | 107798204 A | 3/2018 |

OTHER PUBLICATIONS

Guangcun et al.; "Study on Erosion Behavior and Mechanism of Impeller's Material FV520B in Centrifugal Compressor;" Journal of Mechanical Engineering; 2014; pp. 182-190; vol. 50, No. 19.

Aug. 2, 2018 Office Action issued in Chinese Patent Application 201711298231.5.

Jan. 4, 2019 Search Report issued in International Patent Application No. PCT/CN2018/109138.

Jan. 4, 2019 Written Opinion of the International Searching Authority issued in International Patent Application No. PCT/CN2018/109138.

\* cited by examiner

METHOD OF TANGENTIAL GRADIENT THERMAL SPRAYING COATING FOR COMPLEX PROFILE WORKPIECES

FIELD OF THE INVENTION

The present invention relates to the field of thermal spraying technology, in particular to a design method of tangential gradient thermal spraying coating for complex profile workpieces.

BACKGROUND OF THE INVENTION

Parts with complex profile in erosion conditions are widely applied to the industries of petroleum, chemical engineering, metallurgy and the like, and play an important role in economic development. A large centrifugal compressor impeller is a typical complex profile part, which is generally made of an ultra-high strength material, and is complex in the spatial geometrical structure and high in material cost and processing cost. Blade thinning is an important damage form due to the erosion wear of gas-solid two-phase flow. Thermal spraying technology is one of the important technologies for enhancing the erosion-resistant performance of the surface.

The erosion rate, as an important indicator of erosion wear, is greatly influenced by the impact angle between incident particles and a complex profile surface and the brittle ductile property of the coating material. As shown in FIGS. 1 and 2, the brittle coating material has good erosion-resistant performance at medium to low angles, while the ductile material has good erosion-resistant performance at high angles, and their erosion-resistant performance is of great difference within the range of the impact angle [0°, 90°].

As shown in FIG. 3, the homogeneous coating cannot meet the requirement of erosion-resistant performance of the complex profile surface at various impact angles when it is impacted, as the change range of the impact angle on the whole profile is great. Hence, there is an urgent need for developing a heterogeneous coating with its brittle-ductile property changing along the complex profile surface, to match the impact angle change of the surface during service and improve the erosion-resistant ability.

SUMMARY OF THE INVENTION

To overcome the above-mentioned shortcomings in the prior art, the present invention proposes a design method of tangential gradient thermal spraying coating for complex profile workpieces. According to great difference in the erosion-resistant performance between ductile material and brittle material at different impact angles, the corresponding relation among the ductile-brittle ratio (mass fraction of the ductile material to the mixed powder) of the coating, the erosion rate and the impact angle is obtained by combining theoretical calculation, software simulation and test. The coating structure with the spraying material gradually changing along the complex profile surface is constructed, so that the erosion-resistant performance of the coating matches the requirements of various portions of the complex profile.

Further, the present invention adopts the following technical solution:

A design method of tangential gradient thermal spraying coating for complex profile workpieces comprises the following steps:

step 1: determining the change rule of the impact angle between the surface of the complex profile workpiece and erosion particles according to the structure and working conditions of the complex profile workpiece;

step 2: selecting an erosion-resistant coating material according to the service condition requirement, including a brittle material and a ductile material;

step 3: spraying the erosion-resistant coating material of step 2 to the workpiece and performing an erosion test to obtain a relation among the impact angle, ductile-brittle ratio and erosion rate of the erosion-resistant coating;

step 4: determining the corresponding relation between the ductile-brittle ratio of the erosion-resistant coating and the impact angle according to steps 1 and 3, as well as the erosion threshold constraint condition of the complex profile workpiece; and step 5: determining the corresponding relation between the coating ductile-brittle ratio and the surface position of the complex profile workpiece according to the correspondence from step 4, and performing thermal spraying on the surface of the complex profile workpiece.

Further, in step 1, the working conditions comprise erosion particle performance (type, particle size and shape) and environmental conditions (velocity of gas-solid two-phase flow, pressure and temperature).

Further, in step 1, the service of the complex profile workpiece is analyzed, gas phase boundary conditions and particle boundary conditions are theoretically calculated and extracted, and simulation analysis is performed by using fluid simulation software to obtain the change rule of the impact angle between the surface of the complex profile workpiece and the erosion particles.

In step 2, the types of the brittle material and the ductile material in the erosion-resistant coating material are determined according to the erosion-resistant performance of the brittle material and the ductile material in conjunction with the service condition requirement of the workpiece.

Further, in step 2, the erosion-resistant coating material is formed by mechanically mixing the brittle material and the ductile material.

Further, the change range of the ductile-brittle ratio of the erosion-resistant coating material is [0,1].

Further, step 3 specifically includes:

compounding the brittle material and the ductile material selected in step 2 in different mixing ratios to obtain the erosion-resistant coating material, performing spraying on the workpiece, designing a multi-factor erosion test by using an orthogonal test method to obtain test data of the impact angle, the ductile-brittle ratio and the erosion rate, and performing fitting to obtain a relation curve.

Further, in step 4, the erosion threshold constraint condition of the complex profile workpiece is calculated according to the service condition requirement and rated life of the complex profile workpiece.

Further, in step 5, the ductile-brittle ratio of the coating for different positions of the workpiece surface and different impact angles is finally obtained with the minimum average value of the erosion rate at various impact angles as the optimization objective, with the relation among the impact angle, the ductile-brittle ratio and the erosion rate determined in step 3 as the constraint condition, with the impact angles corresponding to points on the surface of the complex profile workpiece as a position constraint, and an equation of the ductile-brittle ratio with respect to the impact angle being set as a continuity constraint of the coating ductile-brittle ratio, to obtain coating design with tangential gradient on the workpiece surface.

Further, in step 5, thermal spraying is performed on the surface of the complex profile workpiece by using dual-channel powder feeding thermal spraying equipment the powder feeding quantity of which is adjustable in real time, with a controller for controlling the powder feeding quantity to achieve ductile-brittle ratio control.

Compared with the prior art, the present invention has the following beneficial effects:

In the present invention, a coating with erosion-resistant performance matching the impact angle change can be designed on the complex profile surface, which solves the erosion-resistant problem of the complex profile that a homogeneous material coating cannot meet the high range of change of the impact angle.

For the complex profile part with the large range of change of the impact angle, the erosion of the tangential gradient coating obtained in the present invention is more uniform, and the overall average erosion rate is lower. The method can be used for strengthening of new products and size repair of damaged parts, and can effectively prolong the service life.

BRIEF DESCRIPTION OF THE DRAWINGS

The drawings as part of the present application are used for providing further understanding of the present invention, and the schematic embodiments of the present invention and description thereof are used for explaining the present invention, instead of improperly defining the present application.

DETAILED DESCRIPTION OF THE EMBODIMENTS

It should be noted that the following detailed description is illustrative and intended to provide further description for the present application. Unless otherwise indicated, all technical and scientific terms used herein have the same meanings as commonly understood by those of ordinary skill in the art to which the present application pertains.

It needs to be noted that the terms used herein are only used for describing the embodiments, rather than being intended to limit the exemplary embodiments of the present invention. As used herein, unless otherwise indicated expressly in the context, singular forms are also intended to include plural forms. In addition, it should also be understood that the words "comprise" and/or "include" as used in the specification indicate the presence of features, steps, operations, devices, components and/or combinations thereof.

Figure 1:
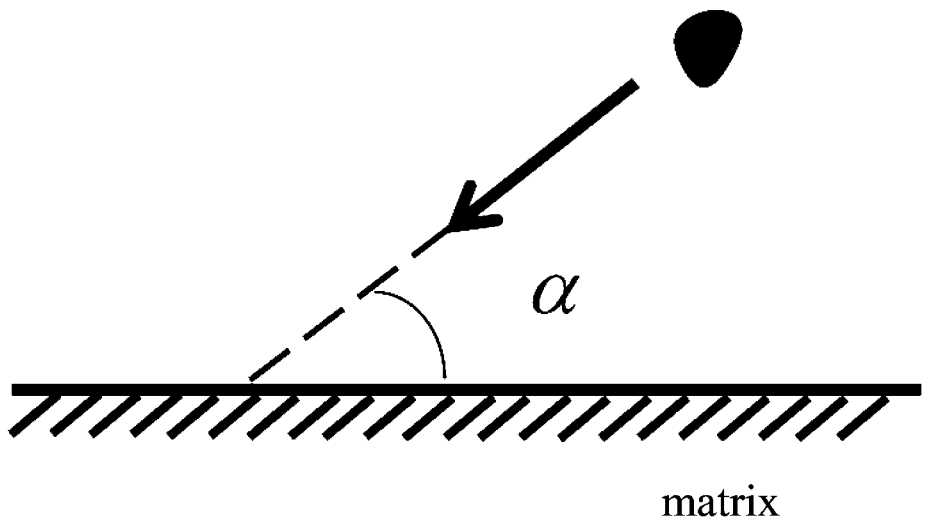
FIG. 1 is a schematic diagram of an impact angle between incident particles and a complex profile surface.
Figure 2:
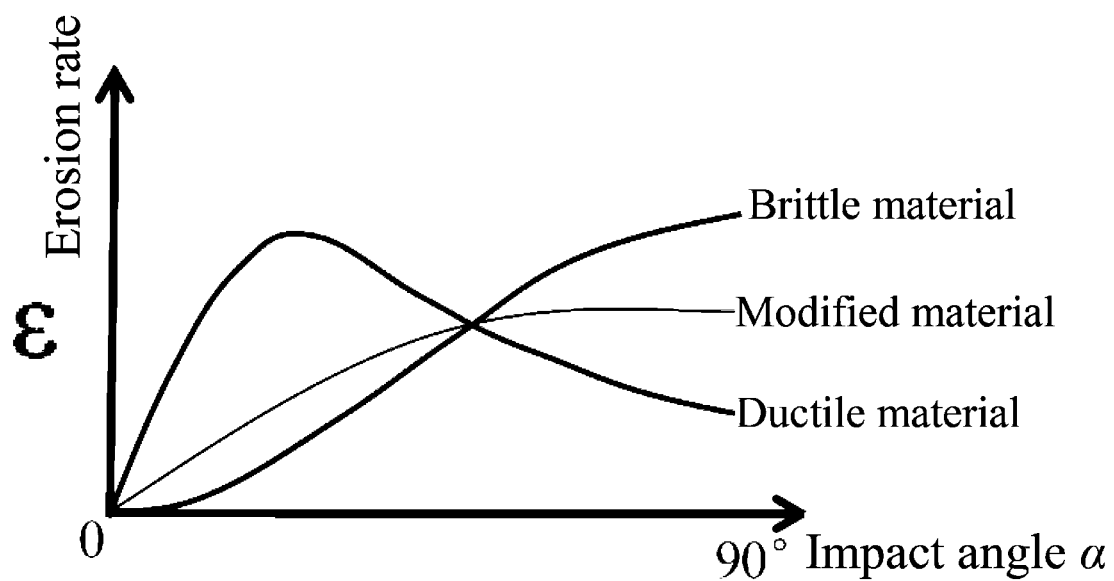
FIG. 2 is a change rule of an erosion rate of a brittle material, a ductile material and a modified material over the change angle.
Figure 3:
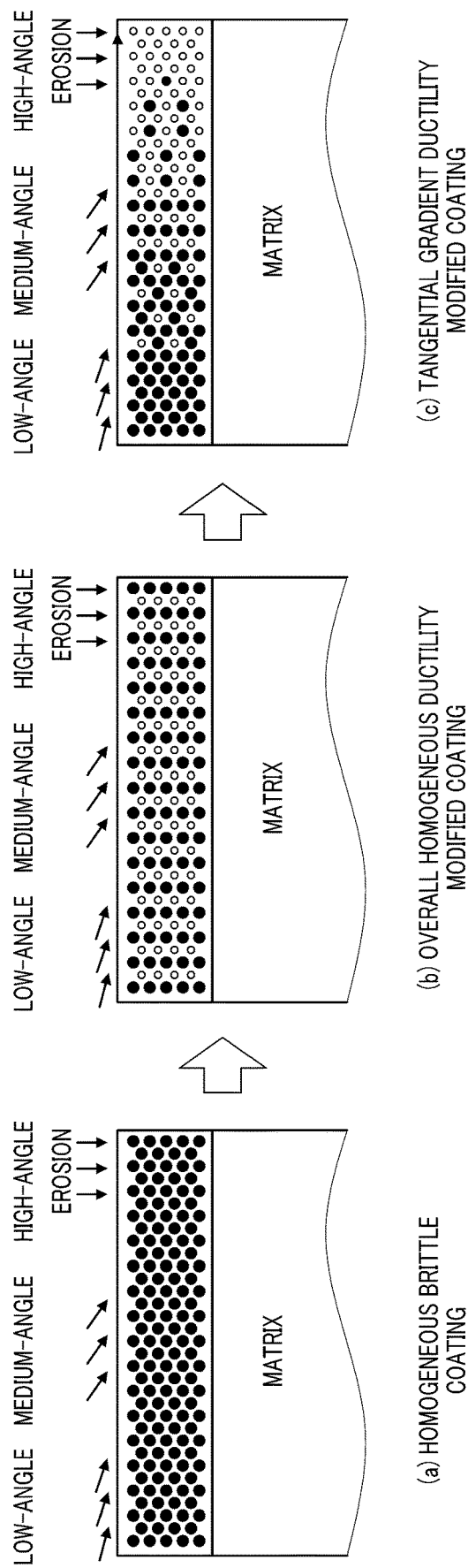
FIG. 3 is a schematic diagram of coating modification.

As introduced in the background art, strengthening or repairing the complex profile part by the homogeneous brittle coating cannot meet the erosion-resistant performance requirement of the coating at various impact angles. To solve the above-mentioned technical problem, the present invention proposes a design method of tangential gradient thermal spraying coating for complex profile workpieces. In view of the erosion-resistant performance requirement in different region of the complex profile, a performance-driven tangential gradient coating system is constructed based on the difference in the erosion-resistant performance of a ductile material and a brittle material at different impact angles (as shown in FIG. 2). That is, the ductile material is added during spraying of the brittle coating material. and by changing the ductile-brittle ratio, the coating performance matches the erosion-resistant performance of various portions, thereby prolonging the service life of the complex profile part. Mostly in the prior art, a single homogeneous brittle coating is made of a brittle material. In the solution of the present invention, the ductile-brittle ratio of the coating changes with the impact angle of the surface.

In a typical embodiment of the present application, a design method of tangential gradient thermal spraying coating for complex profile workpieces is provided, comprising the following steps:

step 1: determining the change rule of the impact angle between the surface of the complex profile workpiece and erosion particles according to the structure of the complex profile workpiece and working conditions;

step 2: selecting an erosion-resistant coating material according to service condition requirement, including a brittle material and a ductile material;

step 3: spraying the erosion-resistant coating material of step 2 to the workpiece and performing an erosion test to obtain a relation among the impact angle, ductile-brittle ratio and erosion rate of the erosion-resistant coating;

step 4: determining the corresponding relation between the ductile-brittle ratio of the erosion-resistant coating and the impact angle according to steps 1 and 3 as well as the erosion threshold constraint condition of the complex profile workpiece; and step 5: determining the corresponding relation between the coating ductile-brittle ratio and the surface position of the complex profile workpiece. and performing thermal spraying on the surface of the complex profile workpiece.

In step 1, the working conditions comprise erosion particle performance (type, particle size and shape) and environmental conditions (gas and solid phase flow velocity, pressure and temperature).

In step 1, the service of the complex profile workpiece is analyzed, gas phase boundary conditions and particle boundary conditions are theoretically calculated and extracted, and simulation analysis is performed by using fluid simulation software to obtain the change rule of the impact angle between the surface of the complex profile workpiece and the erosion particles.

In step 2, the types of the brittle material and the ductile material in the erosion-resistant coating material are determined according to the erosion-resistant performance of the brittle material and the ductile material in conjunction with the service condition requirement of the workpiece.

In step 2, the erosion-resistant coating material is formed by mechanically mixing the brittle material and the ductile material. The change range of the ductile-brittle ratio of the erosion-resistant coating material is [0,1].

Step 3 specifically includes:

compounding the brittle material and the ductile material selected in step 2 in different mixing ratios to obtain the erosion-resistant coating material, performing spraying on the workpiece, designing a multi-factor (impact angle, and ductile-brittle ratio) erosion test by using an orthogonal test method to obtain test data of the impact angle, the ductile-brittle ratio and the erosion rate, and performing fitting by using Matlab to obtain a relation curve.

In step 4, the erosion threshold constraint condition of the complex profile workpiece is calculated according to the service condition requirement and rated life of the complex profile workpiece.

In step 5, the ductile-brittle ratio of the coating for different positions of the workpiece surface and different impact angles is finally obtained with the minimum average value of the erosion rate at various impact angles as the optimization objective, with the relation among the impact angle, the ductile-brittle ratio and the erosion rate determined in step 3 as the constraint condition, with the impact angles corresponding to points on the surface of the complex profile workpiece as a position constraint, and an equation of the ductile-brittle ratio with respect to the impact angle as a polynomial function being set as a continuity constraint of the coating ductile-brittle ratio, to obtain coating design with tangential gradient on the part surface.

In step 5, thermal spraying is performed on the surface of the complex profile workpiece by using dual-channel powder feeding thermal spraying equipment the powder feeding quantity of which is adjustable in real time, with a controller for controlling the powder feeding quantity to achieve ductile-brittle ratio control.

To enable those skilled in the art to understand the technical solution of the present application more clearly, a detailed description of the technical solution of the present application will be given below in conjunction with the particular embodiments.

Using a compressor impeller (the matrix material is FV520B) as an example, a design method of spraying coating $TiB_2$-M ("$TiB_2$" is a brittle ceramic material, and "M (Metal)" is a ductile metal material, with the mass ratio of "M" and "$TiB_2$" as the ductile-brittle ratio) on the surface specifically comprises the following steps:

(1) identifying the model, working conditions and rated life of the compressor impeller.

(2) determining the change rule of the impact angle of the surface of the compressor impeller. According to the operation environment conditions of the impeller (gas and solid phase flow velocity, pressure and temperature, etc.) and erosion particle features (type, particle size and shape), gas phase boundary conditions and particle boundary conditions are theoretically calculated and extracted. Simulation analysis is performed on the change rule of the impact angle of the impeller surface by using fluid simulation software such as Fluent to obtain a relation between the impact angle and the impeller polar coordinates.

(3) determining the erosion-resistant coating material. The service conditions (such as temperature, humidity, wind velocity, particle size, etc.), the coating performance requirement (the requirement on the corrosion resistance, high temperature resistance, erosion resistance, etc.), as well as the binding property of the coating and the matrix material (the requirement on the binding strength, etc.) and the like of the compressor impeller are analyzed to select a $TiB_2$-M coating system. Metal Ni, Co, Fe or Cr is selected as the ductile material according to the wettability of M and $TiB_2$.

Figure 4:
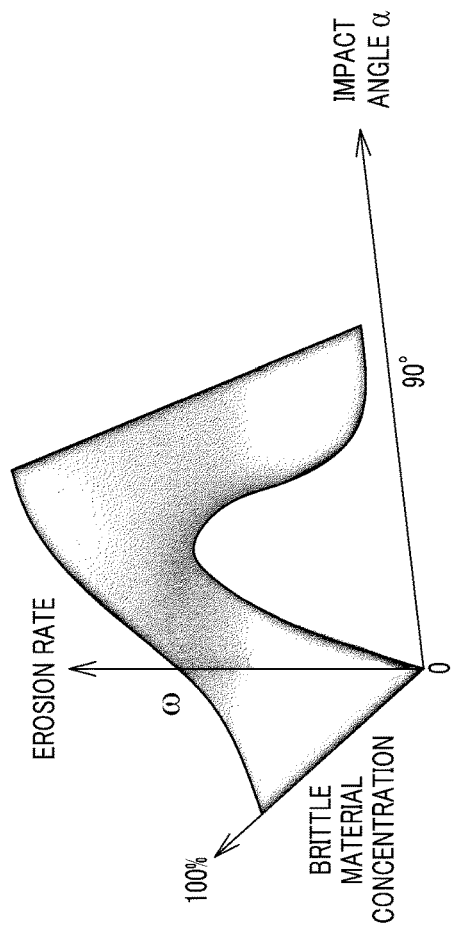
FIG. 4 is a relation curve of the impact angle, ductile-brittle ratio and erosion rate.

(4) determining a relation among the impact angle, ductile-brittle ratio and erosion rate of the coating. The $TiB_2$-M coating system determined in the previous step is adopted, test data of the impact angle $\alpha$ (0°-90°), ductile-brittle ratio k (0%-100%) and erosion rate $\varepsilon$ are obtained by using an orthogonal test method, and their relation equation and response surface are fitted by using Matlab software, as shown in FIG. 4.

(5) matching the tangential gradient coating and the impeller surface impact angle. The coefficients are solved with the minimum average value of the erosion rate at various impact angles as the optimization objective, with an equation of the erosion rate with respect to the ductile-brittle ratio and the impact angle as a constraint condition, with an equation of the impact angle of various points on the impeller surface as a position constraint, and an equation of the ductile-brittle ratio with respect to the impact angle as a polynomial function being set as a continuity constraint of the coating ductile-brittle ratio. In this way, the ductile-brittle ratio of the coating at different positions on the impeller surface and at different impact angles is obtained, and the coating design with tangential gradient of the impeller surface is achieved.

(6) Spraying the coating. Thermal spraying is performed by using dual-channel powder feeding thermal spraying equipment, the powder feeding quantity of which is adjustable in real time, based on an impact angle matching relation between the tangential gradient coating and the impeller surface.

Described above are merely preferred embodiments of the present application, which are not intended to limit the present application. For those skilled in the art, various variations and changes may be made to the present application. All modifications, equivalent substitutions, improvement and the like made within the spirit and principle of the present application shall be encompassed within the protection scope of the present application.

The invention claimed is:

1. A design method of tangential gradient thermal spraying coating for a centrifugal compressor impeller, the method comprising:

determining an impact angle of erosion particles along a surface of the centrifugal compressor impeller according to a structure of the centrifugal compressor impeller and predetermined working conditions of the centrifugal compressor impeller;

selecting an erosion-resistant coating material comprising a brittle material and a ductile material according to a service condition requirement of the centrifugal compressor impeller;

spraying the selected erosion-resistant coating material to the centrifugal compressor impeller and conducting an erosion test on the centrifugal compressor impeller that had the selected erosion-resistant coating material sprayed to it so as to provide an erosion-resistant coating on the centrifugal compressor impeller, to obtain a relation among the impact angle, ductile-brittle ratio and erosion rate of the erosion-resistant coating;

based on the impact angle of erosion particles along a surface of the centrifugal compressor impeller determined above, optimizing the obtained relation between the ductile-brittle ratio of the erosion-resistant coating and the impact angle to obtain a minimized average value of the erosion rate of the erosion-resistant coating for different positions on the centrifugal compressor impeller with different impact angles, with the relation among the impact angle, the ductile-brittle ratio and the erosion rate as a constraint condition, with the impact angles corresponding to points on the surface of the centrifugal compressor impeller as a position constraint, and a polynomial equation of the ductile-brittle ratio with respect to the impact angle being set as a continuity constraint of the ductile-brittle ratio of the erosion-resistant coating; and determining a corresponding relation between the ductile-brittle ratio of the erosion-resistant coating and surface location on the centrifugal compressor impeller utilizing the minimized average value of the erosion rate, and performing thermal spraying on the surface of the centrifugal compressor impeller utilizing the determined relation between the ductile-brittle ratio of the erosion-resistant coating and surface location of the centrifugal compressor impeller, wherein the erosion test comprises compounding the brittle material and the ductile material from the selected erosion-resistant coating material in different mixing ratios to obtain the erosion-resistant coating material, performing spraying on the centrifugal compressor impeller, designing a multi-factor erosion test by using an orthogonal test method to obtain test data of the impact angle, the ductile-brittle ratio and the erosion rate, and performing fitting to obtain a relation curve.

2. The design method of claim 1, wherein the determining of the impact angle of erosion particles along a surface of the centrifugal compressor impeller comprises obtaining a model of the impeller, defining gas phase boundary conditions and particle boundary conditions, and performing simulation analysis to determine the impact angle of the erosion particles along the surface of the centrifugal compressor impeller.

3. The design method of claim 1, wherein in the selection step, the service condition requirement comprises a coating performance requirement, a binding property of the erosion-resistant coating and a material of the centrifugal compressor impeller.

4. The design method of claim 1, wherein the ductile-brittle ratio represents the mass ratio of ductile material to the total mass of ductile and brittle material.

5. The design method of claim 1, wherein, thermal spraying is performed on the surface of the centrifugal compressor impeller by employing dual-channel powder feeder, the powder feeding quantity of which is adjustable in real time to achieve ductile-brittle ratio control.

* * * * *